J. S. Foster,
Bread Machine,

N° 59,905.  Patented Nov. 20, 1866.

Witnesses:
Henry A. Cottrell
David R. Trumbo

Inventor,
Jos. S. Foster.

United States Patent Office.

IMPROVED PASTRY ROLLER.

JOSEPH S. FOSTER, OF SAN FRANCISCO, CALIFORNIA.

Letters Patent No. 59,905, dated November 20, 1866.

SPECIFICATION.

TO ALL WHOM IT MAY CONCERN:

Be it known that I, JOSEPH S. FOSTER, of the city and county of San Francisco, and State of California, have invented a new and improved Pastry Roller; and I do hereby declare that the following is a full, clear, and exact description thereof, which will enable those skilled in the art to make and use the same, reference being had to the accompanying drawings, forming part of this specification, of which—

Figure 1:
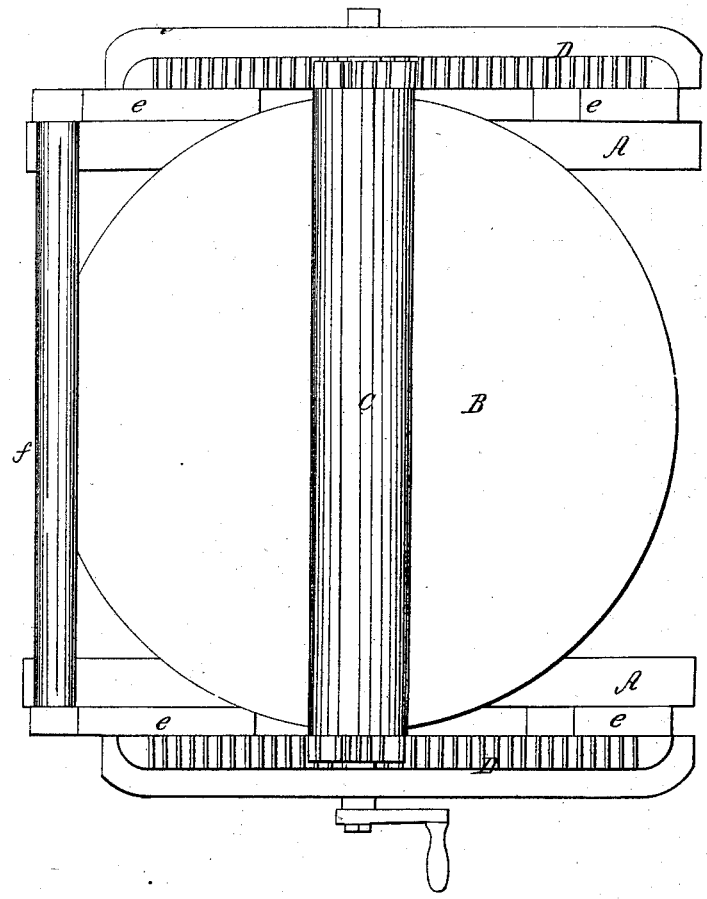
Figure 2:
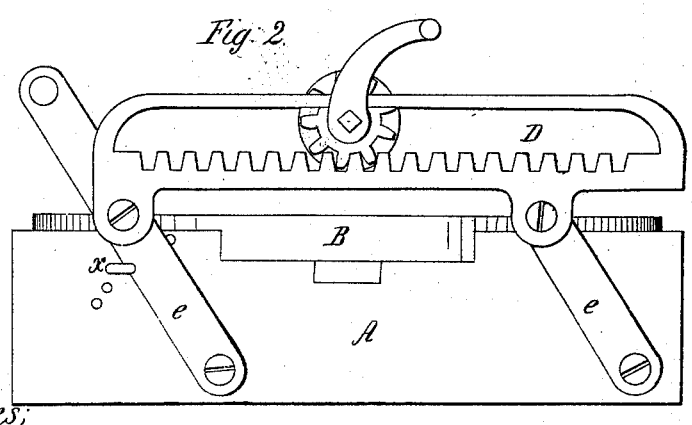

Figure 1 is a top view, and
Figure 2 a side view of this invention.
Similar letters of reference indicate corresponding parts.

This invention relates to an improved machine for rolling pastry to any desired uniform thickness, and consists of a pastry board and frame, a roller with a cog-wheel upon each end, and two guide racks with rods connecting them to the frame. The frame, A, consists of two pieces of wood, or other suitable material, placed parallel with each other and connected by one or more strips. Upon this frame is placed the pastry board, B. This board is made circular and is let into the frame the thickness of the board, or otherwise arranged so that it may be revolved or turned in a horizontal direction. Upon each end of the roller, C, is affixed a cog-wheel and shaft, one shaft having a crank or handle attached. The two guide racks, D D, which may be constructed of iron, or other suitable material, each consists of a rack, into which the cogs upon the ends of the roller mesh, and a guide bar under which the shaft runs. The guide bars are not directly over the racks but just on one side. One of the guide racks is connected to each side of the frame by the rods *e e*. The rods are attached to the frame and the guide racks to the rods by pins, allowing the upper ends of the rods to be raised or lowered. The distance between the pin by which the rack is attached to the rod and the pin by which the rod is attached to the frame is the same on all the rods. The distance between the pins by which each rack is attached to the rods and the distance between the pins on each side of the frame by which the rods are attached to the frame are also equal, so that as the ends of the rods are raised or lowered the guide racks are raised or lowered, but will always remain parallel with the plane of the pastry board. One rod upon each side opposite each other is made longer than the other, the two longer ones being connected by the cross-bar *f*. The pin, *x*, against which one of the longer rods strikes, may be placed in either of the several holes, thus allowing the roller only to come within any desired distance of the pastry board. The mode of operation is as follows: The material to be rolled is placed upon the centre of the pastry board, one hand is placed upon the cross bar, and the crank attached to the roller is turned by the other hand, first in one direction and then the other, thus causing the roller to pass back and forth over the pastry board, one end of the roller advancing as fast as the other. When the rod strikes the pin, *x*, the roller can get no lower and will pass over the pastry board at a uniform distance, thus making the pastry of any desired uniform thickness. When desired, the pastry board may be turned, thus rolling across it in a different direction from the former rolling.

Having thus described my invention, what I claim as new, and desire to secure by Letters Patent, is—

The combination of the revolving board B, the roller C, the adjustable guide racks D D, with the rods *e e e e*, operating substantially as and for the purpose specified.

JOS. S. FOSTER.

Witnesses:
GEO. Y. DICKSON,
J. L. BEATTY.